United States Patent
Ellis et al.

(10) Patent No.: US 10,702,877 B2
(45) Date of Patent: Jul. 7, 2020

(54) HIGH-VOLUME FOAM SPRAY GUN

(71) Applicant: PEDERO PIPE SUPPORT SYSTEMS USA, LP, Magnolia, TX (US)

(72) Inventors: Peter Ellis, Magnolia, TX (US); Bernard Westby, Magnolia, TX (US)

(73) Assignee: Pedero Pipe Support Systems USA, LP, Magnolia, TX (US)

( * ) Notice: Subject to any disclaimer, the term of this patent is extended or adjusted under 35 U.S.C. 154(b) by 187 days.

(21) Appl. No.: 15/714,829

(22) Filed: Sep. 25, 2017

(65) Prior Publication Data
US 2018/0126396 A1    May 10, 2018

Related U.S. Application Data

(60) Provisional application No. 62/419,831, filed on Nov. 9, 2016.

(51) Int. Cl.
*B05B 7/04* (2006.01)
*B05B 12/00* (2018.01)
(Continued)

(52) U.S. Cl.
CPC .......... *B05B 7/0408* (2013.01); *B05B 7/0025* (2013.01); *B05B 7/2497* (2013.01);
(Continued)

(58) Field of Classification Search
CPC . B05B 7/0408; B05B 12/0026; B05B 7/0025; B05B 7/2497; B05B 15/52; B05B 12/002; F16L 1/06; F16L 3/26
(Continued)

(56) References Cited

U.S. PATENT DOCUMENTS 3,291,396 A * 12/1966 Walter .................. B05B 7/0408
                                                239/412
3,437,273 A *  4/1969 Hagfors ................ B29B 7/761
                                                239/414
(Continued)

OTHER PUBLICATIONS

Probler P2 Expanded Diagram (see URL http://www.purepoly.com/graco-eguipment/spray-guns/probler-p2/probler-p2-expanded-diagram.html), 1 page, unverified Internet Archive indicates archived date of Sep. 25, 2016 (see https://web.archive.org/web/20160925203622/http://www.purepoly.com/graco-equipment/spray-guns/probler-p2/probler-p2-expanded-diagram.html).
(Continued)

*Primary Examiner* — Chee-Chong Lee
(74) *Attorney, Agent, or Firm* — Rao DeBoer Osterrieder, PLLC; John M. DeBoer (57) ABSTRACT

A high-volume foam spray gun assembly having a mixing section comprising a chamber bore, and a mixing chamber movingly disposed within the chamber bore. The mixing chamber further includes a first lateral orifice, a second lateral orifice, a central mixing bore, and a central mixing bore outlet. The spray gun assembly is operable to spray a foam product out of the spray tip at a rate of in the range of about 10 lbs/min to about 100 lbs/min. The first lateral orifice has a first lateral orifice diameter in the range of at least greater than 0.1 inches. The second lateral orifice has a second lateral orifice diameter in the range of at least greater than 0.1 inches.

9 Claims, 5 Drawing Sheets

(51) Int. Cl.
*B05B 7/00* (2006.01)
*B05B 7/24* (2006.01)
*F16L 1/06* (2006.01)
*B05B 15/52* (2018.01)
*F16L 3/26* (2006.01)

(52) U.S. Cl.
CPC ........ *B05B 12/0026* (2018.08); *B05B 12/002* (2013.01); *B05B 15/52* (2018.02); *F16L 1/06* (2013.01); *F16L 3/26* (2013.01)

(58) Field of Classification Search
USPC ........................................... 239/428
See application file for complete search history.

(56) References Cited

U.S. PATENT DOCUMENTS

| | | | | |
|---|---|---|---|---|
| 3,741,441 A | * | 6/1973 | Eberle | B29B 7/42 222/135 |
| 3,790,030 A | * | 2/1974 | Ives | B29B 7/7438 222/135 |
| 3,799,403 A | * | 3/1974 | Probst | B29B 7/7438 222/135 |
| 4,708,292 A | | 11/1987 | Gammons | |
| 5,443,183 A | * | 8/1995 | Jacobsen | B05C 17/00513 222/137 |
| 6,375,096 B1 | | 4/2002 | Rashidi | |
| 9,546,037 B1 | | 1/2017 | Armes et al. | |
| 2005/0035220 A1 | | 2/2005 | Brown | |
| 2007/0034716 A1 | | 2/2007 | Zittel et al. | |
| 2010/0065130 A1 | | 3/2010 | Swab et al. | |
| 2015/0367360 A1 | | 12/2015 | Ingebrand et al. | |

OTHER PUBLICATIONS

Glascraft Probler P2 Spray Gun Dissasembly, Screenshot of video at 0:38 seconds (URL https://www.youtube.com/watch?v=olkk5Qa47Go), 1 page, unverified Date of Publication indicated as Dec. 3, 2013.

* cited by examiner

HIGH-VOLUME FOAM SPRAY GUN

CROSS-REFERENCE TO RELATED APPLICATIONS

This application claims the benefit under 35 U.S.C. § 119(e) of U.S. Provisional Patent Application Ser. No. 62/419,831, filed on Nov. 9, 2016, the entirety of which is incorporated herein by reference for all purposes.

STATEMENT REGARDING FEDERALLY SPONSORED RESEARCH OR DEVELOPMENT

Not Applicable.

BACKGROUND

Field of the Disclosure

This disclosure generally relates to a system having a spray gun assembly configured for a high-volume foam spray discharge. More specifically, the disclosure relates to a spray gun assembly configured for high-volume and long-distance foam spraying. In particular embodiments, the spray gun assembly is used in a pipeline support operation. In other embodiments, the spray gun assembly is used to provide a foam pipeline support that aids cathodic protection.

Background of the Disclosure

Expanding chemical foam compositions, such as curable polyurethane foams, are well known and used in various applications. These foam compositions typically entail mixture of a two-part composition, one part of the composition a resin component and the other part an isocyanate component. These two components of the foaming composition are usually stored under pressure in isolation (e.g., in sealed containment) until use begins.

Each of these components, by itself, is generally inert and stable. Thus if properly stored each component will not cure or cross-link for extended periods of time. In use, the two components of the composition are rapidly mixed together. Immediate cross-linking and foam expansion commences, which ultimately yields a low density, but relatively high load bearing rigid foam. The mixing of the resin component and the isocyanate component must occur at a proper flow ratio and mix under rapid and sufficient mixing conditions to obtain a final acceptable product.

The reactants, including the resin component and the isocyanate component, are stored under pressure in containers, which are attached to hand held dispensing assemblies by means of various hoses and couplings. As the chemical reaction takes place, but albeit before it has completed, the mixed material can be dispensed or sprayed into its form and/or target position for an intended use or purpose.

Foam dispensers, typically spray guns, are well known and have achieved a high degree of usage in factories where components must be adhesively lined with an insulating foam or where products must be packaged and protected from damage during shipment.

However, these jobs (and the configuration of the spray gun) require an operator to be within a short proximate distance to a spray target, such as about 5 to about 10 feet (and oftentimes closer). Moreover, conventional spray guns are routinely impinged or choked in order to limit or control the amount of spray, such as by way of use of protective mesh screening, a specialized pattern tip, and so forth. Since foam is sprayed much like paint, a nice smooth finished spray pattern and product is required, so flow control is paramount as atomization occurs. Without impingement or choking, atomization of the spray and degradation of the pattern would occur.

Slow, controlled spray is desired in conventional foam spray applications, such as for thermal insulation, floatation, coatings, and packaging, none of which require high-volume spray. However, this is not the case in various pipeline foam support related activity, including the making of trench breakers, pillows, and rock shields.

Historically pipeline support used to be in the form of sandbags. But sandbags require hand placement to achieve proper level support for the pipeline. In open trenches, this can be time-consuming and unsafe, and improper placement can again cause the pipeline to oval or dent. More recently, with the growing emphasis on pipeline integrity, pipeline support has seen a shift toward ways of achieving support that is better and faster, and includes the use of rigid foam structure.

To complete a pipeline foam job, a spray gun must be used, since this type of job is remote and outdoor (versus on an assembly line). But a spray gun that is impinged or choked is inadequate, as these guns are limited in spray distance, which means, for example, an operator needs to move into a ditch, which is intrinsically dangerous in this type of setting. Moreover, spray guns typically produce a closed-cell foam product that can be detrimental to cathodic protection used on a pipeline, as it acts as a ground.

What is needed in this instance is a spray gun that can provide a high volume of foam spray tantamount to that would be poured from a source (instead of spray). What is needed is a spray gun system that allows an operator to spray 40-60 feet or more, and which provides OSHA compliance and safe working conditions. What is further needed is a spray gun that not only propels the spray a long distance under high volume discharge, but also still provides some amount of accuracy. Meaning it is desired to have a spray gun assembly that does not spray arbitrarily and uncontrolled. Many pipeline support jobs occur in areas where there are environmental concerns, such as in the wetlands. What is also needed is foam pipeline support that is not detrimental to cathodic protection.

SUMMARY

Embodiments of the disclosure pertain to a foam spray system that may include a spray gun assembly, a first fluid feed source in fluid communication with the spray gun assembly; a second fluid feed source in fluid communication with the spray gun assembly; and a pressurized air feed source in fluid communication with the spray gun assembly.

The spray gun assembly may include a main body having a cylindrical section, a trigger piston section, and a handle section.

The spray gun assembly may include a mixing section having a chamber bore, and a mixing chamber movingly disposed within the chamber bore. The mixing chamber may further include a first lateral orifice, a second lateral orifice, a central mixing bore, a central mixing bore outlet, a mixing chamber end comprising a mixing chamber end outer diameter.

There may be a trigger movingly connected with the mixing section. In aspects, the trigger may be operably associated with the mixing chamber.

The spray gun assembly may include a uniform coupler having a first coupler end threadingly engaged onto the mixing chamber end. There may be a nipple having a first nipple end threadingly engaged into a second coupler end. There may be a spray tip cap threadingly engaged over a second nipple end. There may be a spray tip having a first flared end. In aspects, the spray tip may be disposed through the tip cap, and may extend outward therefrom. The sip may extend outward at least three inches.

The system may include the gun assembly having a first fluid inlet section proximately associated with the mixing section. The first fluid inlet section may include a first fluid inlet, a first fluid outlet, and a first fluid flowpath therebetween.

The system may include the gun assembly having a second fluid inlet section proximately associated with the mixing section. The second fluid inlet section may include a second fluid inlet, a second fluid outlet, and a second fluid flowpath therebetween.

The spray gun assembly may have an air inlet section proximately associated with the mixing section. The inlet section may include an air inlet, an air outlet, and an air flowpath therebetween. There may be a movable chamber piston mechanism disposed in the cylindrical section. The movable chamber piston mechanism may include a rod connected with the mixing chamber. There may be a trigger piston member disposed in the trigger piston section. The trigger piston member may be configured to be moved in reaction to movement of the trigger.

The system may include a first fluid feed source in fluid communication with the first fluid inlet section. The system may include a second fluid feed source in fluid communication with the second fluid inlet section. The system may include a pressurized air feed source in fluid communication with the air inlet section.

In aspects, the mixing chamber may be movable to a spray position whereby the first fluid outlet may align with the first lateral orifice, and the second fluid outlet may align with the second lateral orifice. The spray position may coincide with moving the trigger toward the handle. The spray position may include or pertain to pressurized air moving the trigger piston member. A no-spray position of the gun assembly may coincide with non-alignment of the orifices and outlets. In the no-spray position, pressurized air may be transferred from the pressurized air feed source, through the mixing chamber, and out the spray tip.

In aspects, the spray gun assembly may be operable to spray a foam product out of the spray tip at a rate of in the range of about 10 lbs/min to about 100 lbs/min. The sprayed foam product may be used in the support of piping. In aspects, the first lateral orifice may have a first lateral orifice diameter in the range of at least greater than 0.1 inches and less than 0.2 inches. The second lateral orifice may have a second lateral orifice diameter in the range of at least greater than 0.1 inches and less than 0.2 inches.

The system may include a first pressurized fluid contained within the first fluid feed source. The system may include a second pressurized fluid contained within the second fluid feed source. In aspects, the first fluid feed source may include a resin component. The second fluid feed source may include an isocyanate component. One or both of the resin component and the isocyanate component may be characterized as being able to mix with the other to form a closed-cell foam. In aspects, the resultant sprayed foam product may be characterized as being an open-cell foam.

Other embodiments of the disclosure pertain to a spray gun assembly that may include one or more of: a main body having a cylindrical section, a trigger piston section, and a handle section; a mixing section comprising a chamber bore, and a mixing chamber movingly disposed within the chamber bore. The mixing chamber may further include a first lateral orifice, a second lateral orifice, a central mixing bore, a central mixing bore outlet, a mixing chamber end comprising a mixing chamber end outer diameter.

The spray gun assembly may include a trigger coupled with the mixing section, and the trigger operably associated with the mixing chamber. The assembly may include a uniform coupler having a first coupler end threadingly engaged onto the mixing chamber end. There may be a nipple having a first nipple end threadingly engaged into a second uniform coupler end.

The spray gun assembly may include a spray tip cap threadingly engaged over a second nipple end. There may be a spray tip disposed through the spray tip cap, and extending outward therefrom at least three inches.

The spray gun assembly may include a first fluid inlet section proximately associated with the mixing section. The first fluid inlet section may include a first fluid inlet, a first fluid outlet, and a first fluid flowpath therebetween.

The spray gun assembly may include a second fluid inlet section proximately associated with the mixing section. The second fluid inlet section may include a second fluid inlet, a second fluid outlet, and a second fluid flowpath therebetween.

The spray gun assembly may include an air inlet section proximately associated with the mixing section. The air inlet section may include an air inlet, an air outlet, and an air flowpath therebetween.

The gun assembly may include a movable chamber piston mechanism disposed in the cylindrical section, the movable chamber piston mechanism comprising a rod connected with the mixing chamber. There may be a trigger piston member disposed in the trigger piston section, the trigger piston member being configured to be moved in reaction to movement of the trigger.

The spray gun assembly may include a first fluid feed source in fluid communication with the first fluid inlet section. There may be a second fluid feed source in fluid communication with the second fluid inlet section. There may be a pressurized air feed source in fluid communication with the air inlet section.

In aspects, the mixing chamber may be movable to or associated with a spray position whereby the first fluid outlet aligns with the first lateral orifice, and the second fluid outlet aligns with the second lateral orifice. The spray position of the assembly may coincide with moving the trigger toward the handle, and pressurized air moving the trigger piston member. There may be a no-spray position that coincides or is associated with with non-alignment of the orifices and outlets. The no-spray position may include pressurized air transferring from the pressurized air feed source, through the mixing chamber, and out the spray tip.

In aspects, the spray gun assembly may be operable to spray a foam product out of the spray tip at a rate of in the range of about 10 lbs/min to about 100 lbs/min. The sprayed foam product may be used in the support of piping. The first lateral orifice may have a first lateral orifice diameter in the range of at least greater than 0.1 inches. The second lateral orifice may have a second lateral orifice diameter in the range of at least greater than 0.1 inches.

The spray gun assembly may be coupled with a first fluid feed source having a resin component. The spray gun assembly may be coupled with a second fluid feed source having an isocyanate component. The resin component and the isocyanate component may each be characterized as being able to mix together to form a closed-cell foam in the general sense. However, when these components are used with the spray gun assembly, the sprayed foam product is characterized as being an open-cell foam.

These and other embodiments, features and advantages will be apparent in the following detailed description and drawings.

BRIEF DESCRIPTION OF THE DRAWINGS

A full understanding of embodiments disclosed herein is obtained from the detailed description of the disclosure presented herein below, and the accompanying drawings, which are given by way of illustration only and are not intended to be limitative of the present embodiments, and wherein.

DETAILED DESCRIPTION

Herein disclosed are novel apparatuses, systems, and methods that pertain to a high volume spray gun assembly, details of which are described herein.

Embodiments of the present disclosure are described in detail with reference to the accompanying Figures. In the following discussion and in the claims, the terms "including" and "comprising" are used in an open-ended fashion, such as to mean, for example, "including, but not limited to . . . ". While the disclosure may be described with reference to relevant apparatuses, systems, and methods, it should be understood that the disclosure is not limited to the specific embodiments shown or described. Rather, one skilled in the art will appreciate that a variety of configurations may be implemented in accordance with embodiments herein.

Although not necessary, like elements in the various figures may be denoted by like reference numerals for consistency and ease of understanding. Numerous specific details are set forth in order to provide a more thorough understanding of the disclosure; however, it will be apparent to one of ordinary skill in the art that the embodiments disclosed herein may be practiced without these specific details. In other instances, well-known features have not been described in detail to avoid unnecessarily complicating the description. Directional terms, such as "above," "below," "upper," "lower," "front," "back," "right", "left", "down", etc., are used for convenience and to refer to general direction and/or orientation, and are only intended for illustrative purposes only, and not to limit the disclosure. One of skill would appreciate that the Figures associated herewith may not be to scale, and may be exaggerated in whole or in part in order to provide illustration.

Connection(s), couplings, or other forms of contact between parts, components, and so forth may include conventional items, such as lubricant, additional sealing materials, such as a gasket between flanges, o-rings, PTFE between threads, and the like. The make and manufacture of any particular component, subcomponent, etc., may be as would be apparent to one of skill in the art, such as molding, forming, machining, additive manufacturing, etc. Embodiments of the disclosure provide for one or more components to be new, used, and/or retrofitted to existing machines and systems. One or more components may be made from a metallic material, such as stainless steel, aluminum, metal alloy, etc.

Terms

The term "closed-cell foam" as used herein can refer to a foam product that has cells with trapped gas bubbles formed during the foam's expansion and cure. These gas bubbles consist of the blowing agent and are stringently locked into place during the curing of the foam. The trapped gas increases the insulation capability of the cured foam. The cured foam must be strong and of a medium density in order to lock in the gas bubbles. The foam's strength, coupled with its closed cell nature, enable it to resist liquid water and function as a vapor retarder.

The term "open-cell foam" as used herein can refer to a foam that has open cells, where gas bubbles formed during expansion and cure are released to the atmosphere. An open-cell foam can be characterized as being able to absorb water from surrounding atmospheric air.

The term "rifled" as used herein can refer to using a tool, such as a drill bit, to wear in helical grooves in the internal (bore) surface of a spray gun's tip, which can be suitable to impart additional mixing into a stream sprayed therefrom.

Figure 1A:
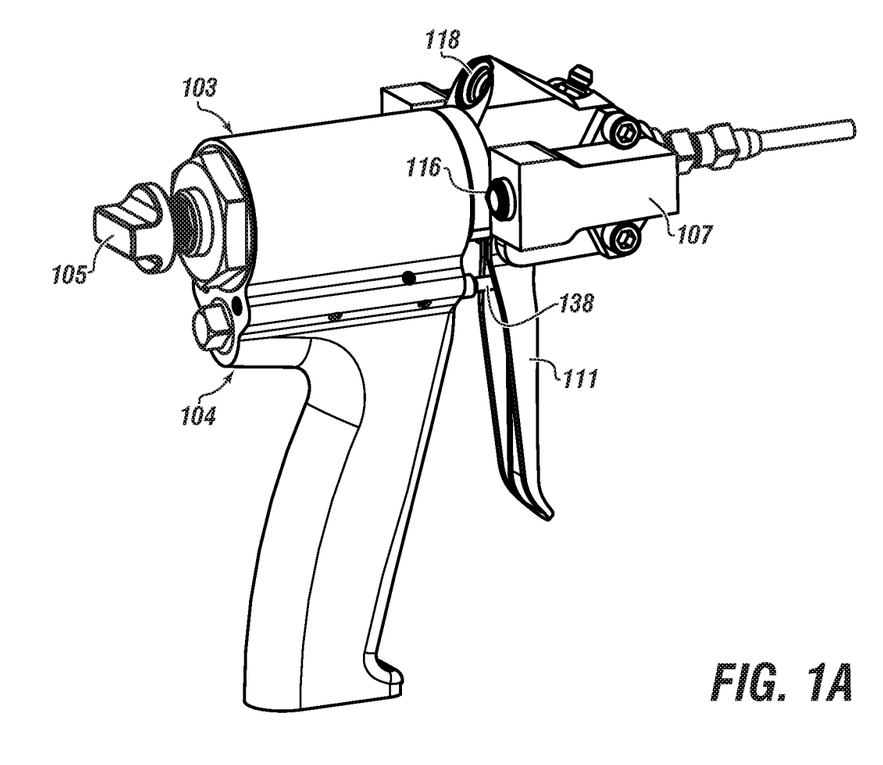
FIG. 1A shows a rearward longitudinal side view of a spray gun assembly according to embodiments of the disclosure.
Figure 1B:
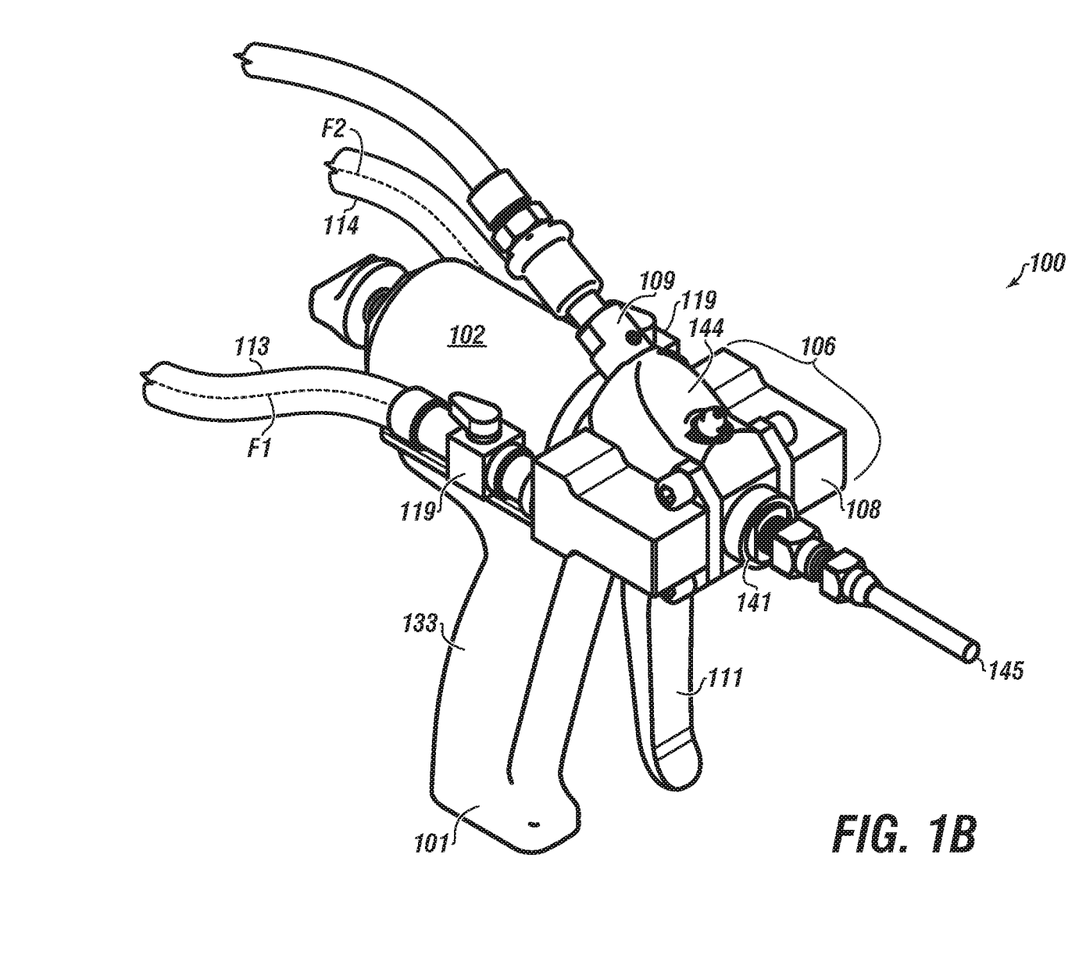
FIG. 1B shows a frontward isometric view of the gun assembly of FIG. 1A with material transfer lines connected therewith according to embodiments of the disclosure.
Figure 1C:
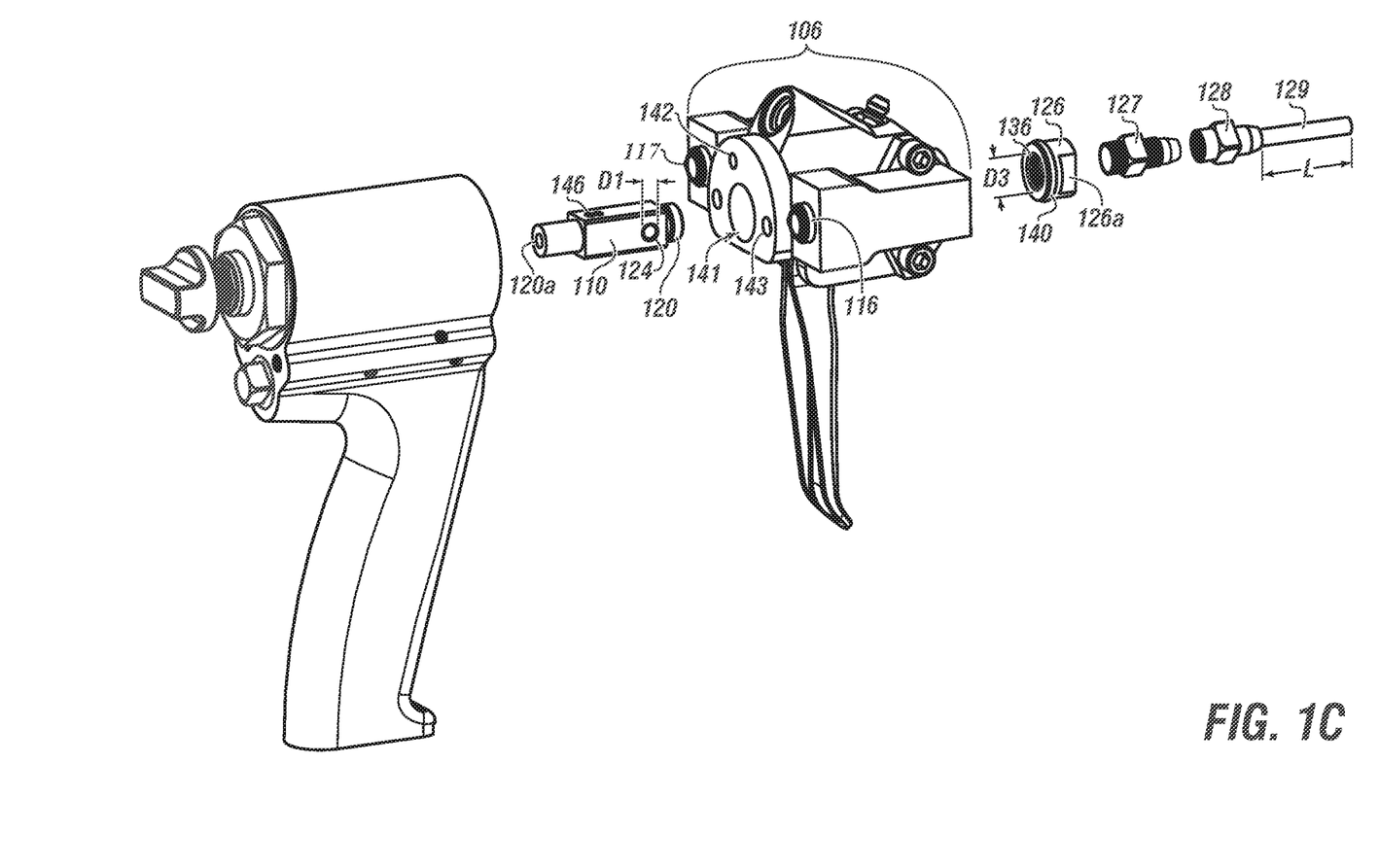
FIG. 1C shows a longitudinal side partial-component breakout view of a mixing section for the spray gun assembly of FIG. 1A according to embodiments of the disclosure.

Referring now to FIGS. 1A, 1B, and 1C together, a rearward longitudinal side view of a spray gun assembly, a frontward isometric view of the gun assembly with material transfer lines connected therewith, and a longitudinal side partial-component breakout view of a mixing section for a spray gun assembly, respectively, in accordance with embodiments disclosed herein, are shown.

The gun assembly 100 generally includes a main body 102 with a handle section 101, and a mixing section 106. Although these elements could be integral to one another, maintenance and cleaning may be made easier by way of the main body 102 and the mixing section 106 (as well as respective subcomponents) being easily separable. Thus, the main body 102 and the mixing section 106 may be held together by various forms of fasteners, including those meant to be easily accessed and removed. For example, there may be one or more screw-type fasteners connectable between the main body 102 and the mixing section 106 (including via screwholes 143 and holes of the main body—not seen here), whereby these elements are securable together during operation of the assembly 100, but separable for cleaning and maintenance. These elements may be sealable (and matable) to accommodate such a connection.

There may be various airflow passages of the gun assembly 100, including air passageway 142, which promotes airflow into a first cylindrical section 103. When the internals of the gun assembly 100 are removed, the passages may be viewed and easily cleaned using a tool, such as a drill bit.

A releasable piston stop may be actuated (such as via a push and turn) using safety lock mechanism 105. Various parts of a movable chamber piston mechanism, such as o-rings, rings, a shaft, and a spring (not shown here) may be associated therewith. The safety lock mechanism 105, when in a respective 'off' or 'no-spray' position, may be configured to prevent a movable chamber piston mechanism (not shown here) from moving. When the lock mechanism 105 is moved to an 'on' or 'spray' position, the movable chamber piston mechanism may be movable, including by way of pneumatic activation, in a similar manner to a Probler P2 spray gun.

The main body 102 may include the movable chamber piston mechanism disposed within the first cylindrical section 103. The movable chamber piston mechanism may be operably coupled to a mixing chamber 110. The mixing section 106 may include a chamber bore 141 into which one or more components may be positioned (including movably positioned) and/or affixed, such as the mixing chamber 110. The mixing section 106 may include main mixing section body 144, which may be made of a durable metal such as aluminum or stainless steel.

The mixing chamber 110 may have a first lateral orifice 124 more or less radially opposite a second lateral orifice (125, not viewable here) on its other side. The orifices 124, 125 may provide the flowpath for reactants to enter into a central mixing bore (not viewable here) of the chamber 110.

The first orifice 124 may have a first diameter D1 greater than 0.086 inches. In aspects, D1 may be in the range of about 0.1 inches to about 0.2 inches. Similarly the second orifice 125 may have a second diameter D2 greater than 0.086 inches. In aspects, D2 may be in the range of about 0.1 inches to about 0.2 inches. The first diameter D1 and the second diameter D2 may be substantially equal to each other (i.e., +/−0.01 inches), thus promoting substantially equal flow rates of the resin and the isocyanate.

The mixing chamber 110 may be hardened stainless, so proper care and tooling may be necessary to size the lateral orifices 124, 125 properly. The first diameter D1 and the second diameter D2 may be sized in a manner to promote high-volume foam spray from the gun assembly 100, which may be in the range of about 10 lbs/min to about 100 lbs/min of sprayed material.

The first lateral orifice 124 and the second lateral orifice 125 may be radially offset (including just slightly) from each other. The offset distance may be about 0.01 inches to about 0.001 inches. Offset orifices 124, 125 may be useful to prevent material from one source inadvertently transferring into the other as a result of reduced or loss of source pressure.

The mixing chamber 110 may have two flat sides relative to the location of respective orifices 124, 125. The mixing chamber 110 may have a connecting end 120a configured for connecting to a rod (not shown here) that may be operably associated with the movable chamber piston mechanism. In this respect of direct coupling, the mixing chamber 110 may thus be movable upon actuation and movement of the movable chamber piston mechanism.

The mixing section 106 may have trigger 111 movably connected therewith, such as via pivot point 112. The trigger 111 may be configured for moving toward an elongated member 133. When the trigger 111 is squeezed beyond a certain point, the gun assembly 100 may be operable in a spray position (see FIG. 3B). The movement of the trigger 111 toward the elongated member may urge a trigger piston member (not shown here), which may be biased to an untriggered position (and thus the trigger 111 may be biased to an 'off' or 'no-spray' position—see FIG. 3A). The trigger piston member may be disposed within trigger piston section

104. Piston cap 137 may be configured for securely retaining the trigger piston member within the trigger piston section 104. An end of piston 138 may extend out of the handle section 101 into movable engagement with the trigger 111. Removal of piston cap 137 provides easy access to the trigger piston section 104 for maintenance and cleaning.

The trigger piston member may be a shaft with one or more orings and respective oring grooves thereon, which may be suitable for creating a seal within the trigger piston section 104. The shaft maybe engaged with a bias member that may be configured for urging an end 138 of the piston member out of the handle section 101. In operation, as the trigger 111 is squeezed and the trigger piston member is moved, various air passages are opened, and air (or other suitable actuation fluid) is able to flow into the cylindrical section 103. The movable chamber mechanism may be configured to be movable via the airflow into the section 103. For example, the movable chamber mechanism may be biased in a manner whereby without activation, the mechanism prevents alignment of orifices 124, 125. However, when the trigger is squeezed, the pressure of the airflow into air inlet section 109, through passage 142, and into the section 103 is suitable to overcome the initial bias, and the mechanism is moved whereby the orifices 124, 125 move into alignment with the reactant component flowpaths.

The other end 120 of the mixing chamber 110 may be coupled with a uniform coupler 126. The 'uniform' coupler 126 may have a uniform internal diameter D3 therethrough. In aspects, the diameter D3 may be in the range of about 0.4 inches to about 0.8 inches. The size of the diameter D3 is of significance in that it attributes to unimpinged discharge of the gun assembly 100. The inside of the coupler 126 may have threading 136 configured for mating with the end 120 of the mixing chamber 110. As such, a first end 140 of the coupler 126 may be engaged with the mixing chamber end 120. The uniform coupler 126 may have an external tooling surface 126, which may be useful for engaging with a pliers or other suitable tool during times of maintenance, repair, cleaning, and so forth.

The other side of the coupler 126 may be configured for treadingly engaging with a nipple 127. Accordingly, the nipple 127 may have external threading and be sized accordingly for engagement with the coupler 126. As would be apparent to one of skill, the nipple 127 may be used for transitioning to a different diameter connection on its other end. The other end of the nipple 127 may have a tip cap 128 engaged therewith. Spray tip 129 may have a flared end. The spray tip may be inserted through the tip cap 128, and as a result of its flared end may be held in place upon engagement with the tip cap 128 onto the nipple 127. The length of the spray tip 129 extending out of the tip cap 128 may be anywhere from negligible to upwards of 6 ft. The greater the length of the tip 129, the greater the length of spray may be.

In aspects, the inside of the spray tip 129 may be 'rifled', thus leaving helical grooves that may promote further turbulence and mixing of the spray material is it leaves the mixing chamber 110 and exits out of the spray tip outlet 145.

Figure 3A:
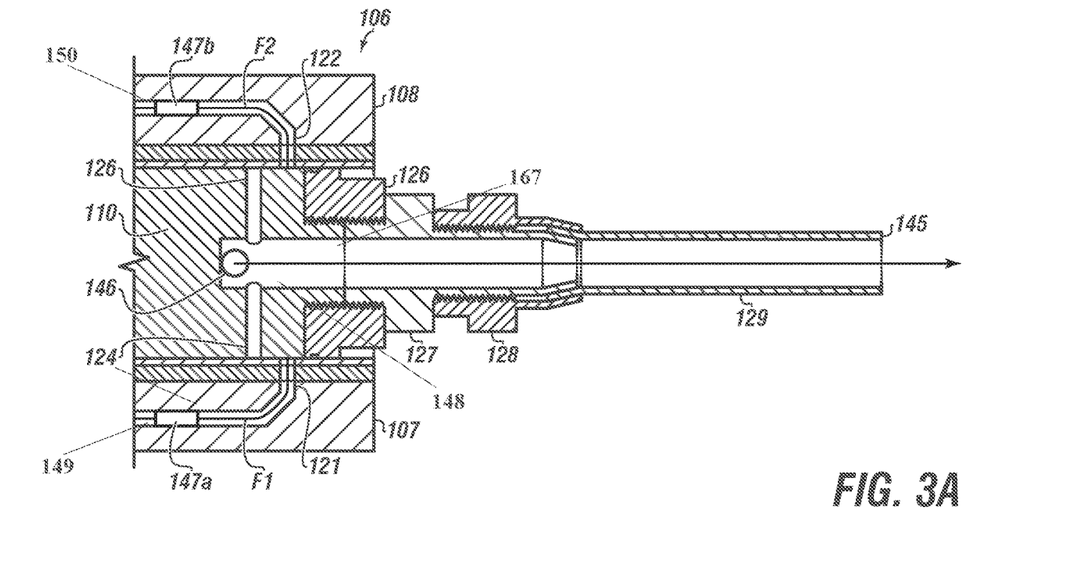
FIG. 3A shows a simplified internal block flow diagram of a spray gun assembly in a 'no-spray' configuration according to embodiments of the disclosure.
Figure 3B:
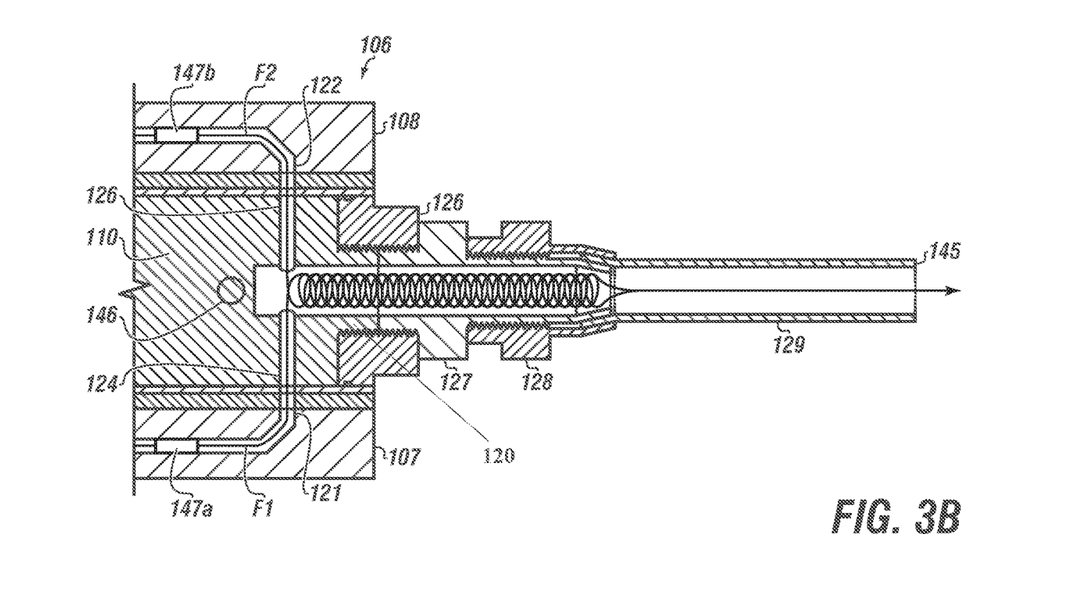
FIG. 3B shows a simplified internal block flow diagram of a spray gun assembly in a 'spray' configuration according to embodiments of the disclosure.

Referring now to FIGS. 3A and 3B together, a simplified internal block diagram of a mixing section of a spray gun assembly in a 'no-spray' configuration, and a 'spray' configuration, in accordance with embodiments of the disclosure, are shown.

The mixing section 106 may have a trigger (111, FIG. 1B) movably connected therewith, as described herein. When the trigger is squeezed beyond a certain point, the gun assembly may be operable in a spray position as shown in FIG. 3B. In operation, as the trigger is squeezed and the trigger piston member is moved, various air passages are opened, and air (or other suitable actuation fluid) is able to flow into, whereby as a result thereof the mixing chamber 110 is moved, and the orifices 124, 125 move into alignment with the reactant component flowpaths 149, 150 of the first fluid inlet section 107 and the second fluid inlet section 108, respectively.

Thus, in the spray position, the mixing chamber 110 may be moved to a position whereby the first and second lateral orifices 124, 125 align with respective exit orifices 121, 122 so that resin and isocyanate may freely flow into the mixing chamber 110 where they are mixed together in the central mixing bore 148, and further result in the flowing of a reacting mixture through (and sprayed out of) the gun assembly 100 at outlet 145. The central mixing bore 148 may have a central mixing bore outlet 167. The central mixing bore outlet 167 may be unimpinged. Fluid communication between the reactant sources and the gun assembly 100 may be provided via transfer lines (113, 114 FIG. 1B).

When the trigger is released, the respective orifices (re) unalign so that resin and isocyanate cannot freely flow into the mixing chamber 110. Moreover, in the released position (and thus back to a no-spray position) the utility fluid F3 may flow into the mixing chamber 110 via inlet 146. In this aspect, the utility fluid F3 may displace substantially any and all remnant materials that there is no solidification and blockage within the gun assembly 100, as it is blown out of the outlet 145, as shown in FIG. 3A.

The gun assembly may include multiple subcomponents, including check valves, seat plugs, O-rings, seats, and so forth. For example, the first fluid inlet section 107 and the second fluid inlet section 108 may have respective check valves 147a, 147b

The fluid sections 107 and 108 may have reactant flowpaths 149, 150 between the inlets 116, 117 and the exit orifices 121, 122, respectively. It is when the chamber orifices 124, 125 align with respective section exit orifices 121, 122 that reaction between the components in the mixing chamber 110 may commence, and sufficient pressure may be suitable to propel the reacting mixture out of the outlet 145 of the gun assembly 100.

Various seals, O-rings, etc. may provide sufficient sealing to maintain pressure and prevent leaks within the mixing section 106, even if the resin and/or catalyst is at high pressure. In aspects, each of the fluid sections may have check valves 147a, 147b for preventing backflow. As would be understood by one of skill the art, the respective check valve 147a, 147b may have, for example, a biased member biased closed. Upon pressurized component being transferred into the sections 107, 108, the bias may be overcome, and flow may pass thereby. However, upon a loss or drop of pressure, backflow is prevented.

Figure 2:
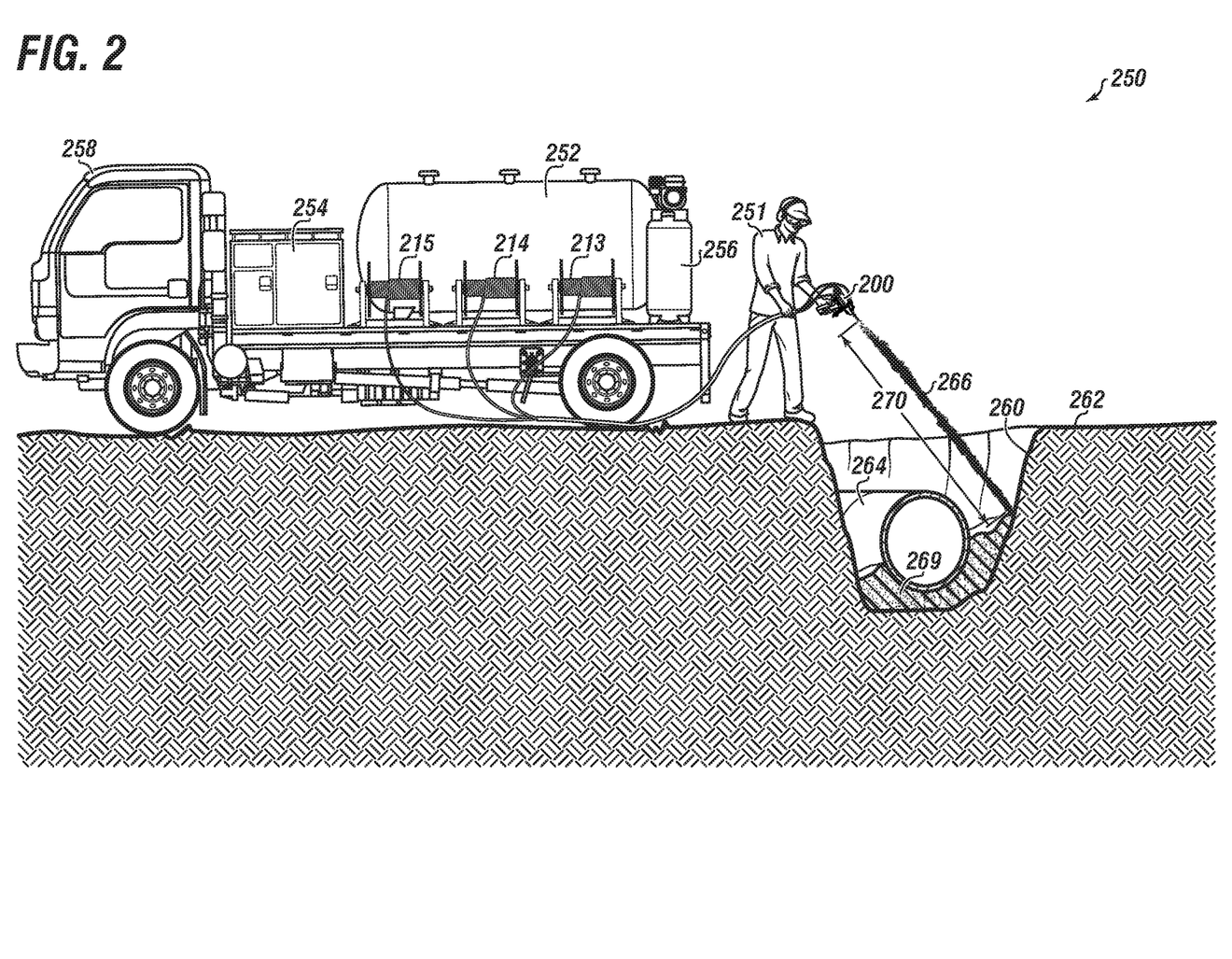
FIG. 2 shows a foam spray system for pipeline support operation according to embodiments of the disclosure.

Referring now to FIG. 2, a process overview of foam spray system useable for a pipeline support operation, in accordance with embodiments disclosed herein, is shown.

A spray system 250 may include a spray gun assembly 200 fluidly coupled with a resin component source 252, an isocyanate component source 254, and a utility fluid source 256. Although not mean to be limited, the utility fluid source 256 may contain pressurized air. Although it need not be the exact same, the gun assembly 200 may be like that of gun assembly 100 described herein, and for the sake of brevity is not described in further detail.

The resin component source 252 and the isocyanate component source 254 may be pressurized in the range of about 1 psi to about 5000 psi. The utility fluid source 256 may include pressurized air, which may be pressurized in the range of about 100 psi to about 150 psi.

Fluid communication between the sources 252, 254, 256 and the gun assembly 200 may be accomplished via the use of respective transfer lines 213, 214, 215. In order to avoid having multiple lines to watch out for, the transfer lines 213, 214, 215 may be bundled together for ease and convenience. Ends of respective transfer lines 213, 214, 215 may have sufficient length extending out of the bundle for suitable connection with the gun assembly 200. Transfer lines 213, 214, 215 may be sufficient in whatever length may be necessary to reach from a support unit 258 to an operator 251. The support unit 258 may be mobile.

The resin component source 252 may contain a pressurized fluid, such as polyurethane mixed with a colorizing agent. The isocyanate component source 254 may contain a different pressurized fluid, such as isocyanate-based material, which may be mixed with the resin (in the mixing chamber of assembly 200) in a wide variety of ratios, such as 0.1:1 to 50:1, depending on the application.

The utility source 256 may contain pressurized air, and may also separately contain or be mixed with solvent. The utility fluid may be used for positive pressure and cleaning purposes of the gun assembly 200. Because the use of dry air is of significance, one or more desiccant dryers may be disposed on the support unit 258, and in fluid communication with the pressurized air source 256, whereby the pressurized air may be sufficiently dried before it enters into the gun assembly 200.

For a desired operation, such as for pipeline support, the operator 251 may drive the support unit 258 to a job site. The operator 251 may take steps known by one of skill in the art to prep the job site to accommodate a spray job. Once the spray gun assembly 200 is ready, the operator may stand on a top surface 262, and thus not have to ingress into a ditch 260.

The operator 251 may identify a target location 269 where support of a pipeline tubular 264 may be desired or useful. The operator 251 then commences the foam spray job by squeezing a trigger (111) of the gun assembly 200, thereby putting the gun assembly 200 in a 'spray' position such that reactants flow from their sources into the gun assembly, initiate reaction, and the resulting mixture sprayed out of the gun assembly 200 to the target 269. The resulting mixture may be sprayed in the range of about 10 lbs/min to about 100 lbs/min. Moreover, the length 270 from the spray gun 200 to the target 269 may be at least 40 ft, thus the gun 200 may be configured to propel the spray mixture 266 the length 270. In aspects, the length 270 may be in the range of 1 ft. to about 60 ft.

As the operator continues to spray the mixture 266, it eventually accumulates and cures into a final settled (cured) foam product. The curing time may be in the range of about 1 second to about 10 seconds.

Perhaps one of the most important safe guards put in place to maintain the long-term integrity of buried pipelines tubulars is a cathodic protection system. Cathodic protection (CP) is an anti-corrosion technique used to prevent the corrosion of metals (such as steel and iron) in electrolytically conducting environments, such as, for example, seawater and soils containing water.

In the case of buried pipelines, CP is achieved when one or more anodes (positive electrodes) discharge electric current to protect the pipeline, which acts as a cathode (negative electrode). If the CP system is electrically cut-off (or shielded) from the pipeline where a hole or gap in the pipeline coating has occurred, then the CP cannot prevent corrosion.

There are many circumstances in which a gap in CP protection could occur, but one of the most obvious is a rocky trench bottom. To prevent contact therewith, a spray foam support may be used. However, a closed-cell foam product may be detrimental to the CP because this type of foam essentially acts as a blockage of the current, which could form a corrosion point.

It has been unexpectedly discovered that in accordance with embodiments herein, a pseudo open-cell foam product may be produced. Thus, the settled foam product may be characterized as having an open-cell configuration. Embodiments herein provide for a spray gun assembly able to change the molecular structure of closed cell rigid foam to open cell.

The change in structure may result in the settled foam product as being able to absorb water, which may then subsequently result in the settled foam product further characterized as being electrically conductive and able to pass current therethrough, and thus allow the CP of the tubular member 264 to continue without any detrimental effect.

It is believed the configuration of the mixing chamber and the gun assembly overall is attributable to this capability, which stems from being able to 'blast' the cells open during the spray operation. Thus, the mixing chamber orifice size (124, 125) is believed of criticality, as well as the unimpinged discharge from the mixing chamber.

What is additionally beneficial is that the open-cell result occurs when what would normally be considered closed-cell reactants are used. Thus, a further synergistic effect may be achieved because the open-cell foam product may have properties of closed-cell foam, such as being rigid and fast-setting, and yet still able to absorb water in order to aid in conductivity. In contrast, typical open-cell foam produced with open-cell reactants (as well as water) tends to be softer and have slower set times.

Moreover, open-cell foam is usually obtained by using an aqueous blowing agent or catalyst; however, the use of water with the resin-isocyanate system would be tantamount to total failure.

It should be appreciated that the resin component and the isocyanate component may include foaming agents, curing agents, catalysts, accelerators, as well as other modifying additives. It should also be appreciated that the first fluid and the second fluid may include materials other than the resin component and the isocyanate component described herein. For example, the first fluid may include an adhesive and the second fluid may include water.

The resin component of the disclosure may include a polyol component. The polyol component may include one or more of a polyether polyol, a polyester polyol, and combinations thereof.

The isocyanate component may include, but is not limited to, isocyanates, diisocyanates, polyisocyanates, biurets of isocyanates and polyisocyanates, isocyanurates of isocyanates and polyisocyanates, and combinations thereof. In one embodiment, the isocyanate component includes an n-functional isocyanate, wherein "n" may be a number from 2 to 5, from 2 to 4, or from 3 to 4. It is to be understood that "n" may be an integer or may have intermediate values from 2 to 5. The isocyanate component may include an isocyanate selected from the group of aromatic isocyanates, aliphatic isocyanates, and combinations thereof. In another embodiment, the isocyanate component includes an aliphatic isocyanate such as hexamethylene diisocyanate, H12MDI, and combinations thereof. The isocyanate component may also include a modified multivalent aliphatic isocyanate, i.e., a product which is obtained through chemical reactions of aliphatic diisocyanates and/or aliphatic polyisocyanates. Examples include, but are not limited to, ureas, biurets, allophanates, carbodiimides, uretonimines, isocyanurates, urethane groups, dimers, trimers, and combinations thereof. The isocyanate component may also include, but is not limited to, modified diisocyanates employed individually or in reaction products with polyoxyalkyleneglycols, diethylene glycols, dipropylene glycols, polyoxyethylene glycols, polyoxypropylene glycols, polyoxypropylenepolyoxethylene glycols, polyesterols, polycaprolactones, and combinations thereof.

The isocyanate component may include an aromatic isocyanate. The isocyanate component may correspond to the formula $R'(NCO)_z$ wherein R' is aromatic and z is an integer that corresponds to the valence of R'. Suitable non-limiting examples of aromatic isocyanates include tetramethylxylylene diisocyanate (TMXDI), 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitro-benzene, 2,5-diisocyanato-1-nitrobenzene, m-phenylene diisocyanate, p-phenylene diisocyanate, 2,4-toluene diisocyanate, 2,6-toluene diisocyanate, mixtures of 2,4- and 2,6-toluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, 3,3'-dimethyldiphenylmethane-4,4'-diisocyanate, triisocyanates such as 4,4',4"-triphenylmethane triisocyanate polymethylene polyphenylene polyisocyanate and 2,4,6-toluene triisocyanate, tetraisocyanates such as 4,4'-dimethyl-2,2'-5,5'-diphenylmethane tetraisocyanate, toluene diisocyanate, 2,2'-diphenylmethane diisocyanate, 2,4'-diphenylmethane diisocyanate, 4,4'-diphenylmethane diisocyanate, polymethylene polyphenylene polyisocyanate, corresponding isomeric mixtures thereof, and combinations thereof. The isocyanate component may include a triisocyanate product of m-TMXDI and 1,1,1-trimethylolpropane, a reaction product of toluene diisocyanate and 1,1,1-trimethyolpropane, and combinations thereof. The isocyanate component may include a diisocyanate selected from the group of methylene diphenyl diisocyanates, toluene diisocyanates, hexamethylene diisocyanates, H12MDIs, and combinations thereof.

Embodiments of the disclosure pertain to a method of forming a foam support structure. The method may include the steps of: driving a mobile support unit a job site, the mobile support unit having isolated, pressurized containers having sufficient amount of reactant components therein. The components may be a resin component and an isocyanate component. Thus, the containers may be a source of the respective components.

The method may include putting a spray gun assembly in fluid communication with one or more sources. The sources may be pressurized. In aspects, one source may be a pressurized resin component. Another sourced may be a pressurized isocyanate component. And yet another source may be a pressurized utility fluid, such as pressurized air (which may have a solvent mixed therewith). Fluid communication may occur via one or more transfer lines and respective connectors, couplings, valving, and so forth. One or more valves may need to be opened so that respective components transfer into the gun assembly.

The method may include the step of operating the gun assembly to move into a spray position. This may include the operator squeezing a trigger toward a handle. In the spray position, reactive components may transfer into a mixing chamber, where an immediate reaction commences.

The method may include the step of continuing to maintain the gun assembly in the spray position, whereby a spray mixture may be discharged from the gun assembly a distance to a desired target location. In aspects, the target location is a point within a ditch near a tubular member. The tubular member may be a pipeline.

The gun assembly may be held in the spray position until an amount of spray mixture has accumulated to form the desired foam support structure. In embodiments, the foam support structure may be one of a trench breaker, a pillow, and a rock shield. In embodiments, the foam support structure may be characterized as being open-cell.

The method may include the use of the gun assembly having a main body comprising a cylindrical section, a trigger piston section, and a handle section. The gun assembly may further have a mixing section comprising a chamber bore, and a mixing chamber movingly disposed within the chamber bore, the mixing chamber further comprising: a first lateral orifice, a second lateral orifice, a central mixing bore, a central mixing bore outlet, a mixing chamber end comprising a mixing chamber end outer diameter; a trigger movingly connected with the mixing section, and the trigger operably associated with the mixing chamber. The main body and the mixing section may be sealingly connected with each other.

The first lateral orifice may have a first lateral orifice diameter in the range of at least greater than 0.1 inches. The second lateral orifice may have a second lateral orifice diameter in the range of at least greater than 0.1 inches. The first and/or second diameters may be in the range of about 0.1 inches to about 0.2 inches. The orifice diameters may be at least greater than 0.086 inches.

The gun assembly may include a uniform coupler having a first coupler end threadingly engaged onto the mixing chamber end; a nipple having a first nipple end threadingly engaged into a second coupler end; a spray tip cap threadingly engaged over a second nipple end; a spray tip comprising a first flared end, the spray tip being disposed through the tip cap, and extending outward therefrom at least three inches.

The gun assembly may include a first fluid inlet section proximately associated with the mixing section, the first fluid inlet section comprising a first fluid inlet, a first fluid outlet, and a first fluid flowpath therebetween. The gun assembly may include a second fluid inlet section proximately associated with the mixing section, the second fluid inlet section comprising a second fluid inlet, a second fluid outlet, and a second fluid flowpath therebetween.

The gun assembly may include an air inlet section proximately associated with the mixing section, the air inlet section comprising an air inlet, an air outlet, and an air flowpath therebetween. The gun assembly may include a movable chamber piston mechanism disposed in the cylindrical section, the movable chamber piston mechanism comprising a rod connected with the mixing chamber. The gun assembly may include a trigger piston member disposed in the trigger piston section, the trigger piston member being configured to be moved in reaction to movement of the trigger.

The spray position may include the first fluid outlet aligned with the first lateral orifice, and the second fluid outlet aligned with the second lateral orifice. In aspects, the spray position may coincide with moving the trigger toward the handle, and pressurized air moving the trigger piston member. In aspects, a no-spray position may coincide with non-alignment of the orifices and outlets, whereby instead pressurized air may be transferred from the pressurized air feed source, through the mixing chamber, and out the spray tip.

When the spray gun assembly is operable and otherwise in the spray position, it may be used by way of configuration to spray a foam product out of the spray tip at a rate of in the range of about 10 lbs/min to about 100 lbs/min.

Advantages

Embodiments of the disclosure advantageously provide for an unimpinged spray gun assembly capable of providing a high-volume foam discharge, useful for various outdoor jobs, such as for creating pipeline support. Beneficially the spray gun assembly further provides contemporaneous accuracy and long-distance discharge. These aspects provide the synergistic effect increased safety to operators and savings in manhours.

Embodiments of the disclosure further provide for being able to produce an open-cell foam, which may result from using typical closed-cell foam reactants. The open-cell foam product may further be beneficial to maintaining cathodic protection of pipelines.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure presented herein are possible and are within the scope of the disclosure. Where numerical ranges or limitations are expressly stated, such express ranges or limitations should be understood to include iterative ranges or limitations of like magnitude falling within the expressly stated ranges or limitations. The use of the term "optionally" with respect to any element of a claim is intended to mean that the subject element is required, or alternatively, is not required. Both alternatives are intended to be within the scope of any claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the preferred embodiments of the disclosure. The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

What is claimed is:

1. A spray gun assembly comprising:
   a main body;
   a mixing section coupled with the main body, the mixing section comprising:
   a chamber bore, and a mixing chamber movingly disposed within the chamber bore, the mixing chamber further comprising:
a first lateral orifice, a second lateral orifice, a central mixing bore, central mixing bore outlet, and a mixing chamber end;
a trigger;
a coupler having a first coupler end engaged onto the mixing chamber end, the coupler having an inner coupler diameter in a coupler diameter range of at least 0.4 inches to no more than 0.8 inches;
a nipple coupled between the coupler and the spray tip cap;
a spray tip disposed through the spray tip cap, and extending outward therefrom in a spray tip range of at least 3 inches to no more than 3 feet; wherein an inside bore of the spray tip is configured with a helical groove;
a first fluid inlet section proximately associated with the mixing section, the first fluid inlet section comprising a first fluid inlet, a first fluid outlet, and a first fluid flowpath therebetween;
a second fluid inlet section proximately associated with the mixing section, the second fluid inlet section comprising a second fluid inlet, a second fluid outlet, and a second fluid flowpath therebetween;
an air inlet section proximately associated with the mixing section;
wherein the first lateral orifice has a first lateral orifice diameter in an orifice size range of at least greater than 0.1 inches and no more than 0.2 inches, wherein the second lateral orifice has a second lateral orifice diameter in a second orifice size range of at least greater than 0.1 inches and no more than 0.2 inches,
wherein the spray gun assembly is operable to spray a foam product out of the spray tip at a rate of in a spray range of at least 10 lbs/min to no more than 100 lbs/min, and wherein the sprayed foam product is used in the support of piping; wherein the spray gun assembly is configured to spray the foam product at a distance range of at least 40 feet and no more than 60 feet;
wherein the spray gun assembly is coupled with a first fluid feed source comprising a resin component, wherein the spray gun assembly is coupled with a second fluid feed source comprising an isocyanate component, wherein the resin component and the isocyanate component are each characterized as being able to mix together to form a closed-cell foam, and wherein the sprayed foam product is characterized as being an open-cell foam.

2. The spray gun assembly of claim 1, wherein the main body comprises a cylindrical section, a trigger piston section, and a handle section, wherein the trigger is coupled with the mixing section, and the trigger is operably associated with the mixing chamber.

3. The spray gun assembly of claim 2, wherein the air inlet section further comprises an air inlet, an air outlet, and an air flowpath therebetween, wherein the first lateral orifice is configured to align with the first fluid outlet when the spray gun assembly is operating in a spray mode, and wherein the second lateral orifice is configured to align with the second fluid outlet when the spray gun assembly is operating in the spray mode.

4. The spray gun assembly of claim 3, the assembly further comprising:
a movable chamber piston mechanism disposed in the cylindrical section, the movable chamber piston mechanism comprising a rod connected with the mixing chamber; and
a trigger piston member disposed in the trigger piston section, the trigger piston member being configured to be moved in reaction to movement of the trigger.

5. The spray gun assembly of claim 4, wherein the mixing chamber is movable to a spray position whereby the first fluid outlet aligns with the first lateral orifice, and the second fluid outlet aligns with the second lateral orifice, wherein the spray position coincides with moving the trigger toward the handle section, and pressurized air moving the trigger piston member, and wherein a no-spray position coincides with non-alignment of the orifices and outlets, and pressurized air transferring from a pressurized air feed source, through the mixing chamber, and out the spray tip.

6. The spray gun assembly of claim 5, wherein the spray gun assembly is coupled with a first fluid feed source comprising a resin component, wherein the spray gun assembly is coupled with a second fluid feed source comprising an isocyanate component, wherein the resin component and the isocyanate component are each characterized as being able to mix together to form a closed-cell foam, and wherein the sprayed foam product is characterized as being an open-cell foam.

7. The spray gun assembly of claim 1, wherein the mixing chamber is movable to a spray position whereby the first fluid outlet aligns with the first lateral orifice, and the second fluid outlet aligns with the second lateral orifice, wherein the spray position coincides with moving the trigger toward the handle section, and pressurized air moving a trigger piston member, and wherein a no-spray position coincides with non-alignment of the orifices and outlets, and pressurized air transferring from a pressurized air feed source, through the mixing chamber, and out the spray tip.

8. The assembly of claim 1, wherein the air inlet section further comprises an air inlet, an air outlet, and an air flowpath therebetween, wherein the first lateral orifice is configured to align with the first fluid outlet when the spray gun assembly is operating in a spray mode, and wherein the second lateral orifice is configured to align with the second fluid outlet when the spray gun assembly is operating in the spray mode.

9. The spray gun assembly of claim 1, wherein the spray tip comprises a flared end, and wherein the flared end is engaged between the tip cap and the nipple.

* * * * *